UNITED STATES PATENT OFFICE.

FRITZ ACH, OF MANNHEIM, GERMANY, ASSIGNOR TO C. F. BOEHRINGER & SOEHNE, OF WALDHOF, GERMANY.

PROCESS OF PREPARING ALKYL-URIC ACID.

SPECIFICATION forming part of Letters Patent No. 631,761, dated August 22, 1899.

Application filed April 16, 1898. Serial No. 677,855. (No specimens.)

*To all whom it may concern:*

Be it known that I, FRITZ ACH, a citizen of the German Empire, residing at Mannheim, in the Empire of Germany, have invented certain new and useful Improvements in Preparing Alkylized Uric Acids; and I do hereby declare the following to be a full, clear, and exact description of the invention, such as will enable others skilled in the art to which it appertains to make and use the same.

This invention relates to the preparation of alkyl derivatives of uric acid proper, or, in other words, of alkyl-uric acids, with particular reference to obtaining such alkyl derivatives by direct methods.

Hitherto only the following members of the isomeric series of monomethyl and dimethyl-uric acids have been obtainable by direct methylation of uric acid: first, alpha-mono-methyl-uric acid, which, according to recent investigations, has the structural formula corresponding to 3-methyl-uric acid and which has been prepared by Hill and Mabery, (*American Chemical Journal*, Vol. 2, page 305, and *Berichte der Deutschen Chemischen Gesellschaft*, Vol. 9, page 370,) and by Emil Fischer, (German Patent No. 91,811, and additional patents Nos. 92,310, 93,112, and 94,631, and in Letters Patent of the United States Nos. 616,656, 616,700, 621,804, and 621,805;) second, 9-methyl-uric acid, prepared by Emil Fischer, (*Berichte der Deutschen Chemischen Gesellschaft*, Vol. 17, page 1777;) third, 3-9-dimethyl-uric acid, prepared by Hill and Mabery and by Emil Fischer, (German Patent No. 91,811 and additional patents,) and, fourth, 7-9-dimethyl-uric acid, prepared by Emil Fischer, (*Berichte*, Vol. 17, page 1780.)

In the course of my researches and investigations in this field I have succeeded in devising a method whereby I am enabled to prepare 7-methyl-uric acid and 3-7-dimethyl-uric acid, which hitherto could be obtained only by indirect methods, directly from uric acid. This new method involved in my invention, broadly considered, consists in the reduction of oxymethylene derivatives of uric acids, which compounds, together with their modes of preparation, are set forth in an application by myself and Lorenz Ach, filed April 21, 1898, Serial No. 678,331.

While it is true that the usual alkylizing agents under the most varied conditions never act first upon the nitrogen atom occupying the position (7) in the uric-acid molecule, (see the nomenclature adopted by Emil Fischer in *Berichte*, Vol. 30, page 557,) still under the process set forth in the aforesaid application the formic aldehyde is bound to the uric acid in the position (7) forming 7-oxymethylene-uric acid. This latter compound, I have found, may readily and directly be converted into 7-methyl-uric acid by reduction. In an analogous manner and as set set forth in the aforesaid application 7-oxymethylene-3-methyl-uric acid, which may be converted into 3-7-dimethyl-uric acid, may be obtained from the action of formic-aldehyde on 3-methyl-uric acid. Finally, 7-oxymethylene-1-3-dimethyl-uric acid, obtained in the manner disclosed in the aforesaid application may be reduced, according to my present invention, to 1-3-7-trimethyl-uric acid or hydroxy-caffein. This reaction, moreover, seems to be susceptible of a still more general application. The process of reduction of the oxymethylene-uric acids is best carried out in acid solutions—such as, for example, hydrochloric acid in connection with tin. Such reduction takes place according to the following scheme:

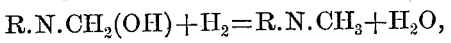

$$R.N.CH_2(OH) + H_2 = R.N.CH_3 + H_2O,$$

where R denotes a molecule of uric acid proper or an alkyl-uric acid less the nitrogen atom in the position (7).

In the following detailed description I have illustrated my invention by three examples, which embody what I consider the preferable manner of carrying the same into effect.

I. *Preparation of 7-methyl-uric acid.*—In preparing this uric acid I take 7-oxymethylene-uric acid, whose mode of preparation and characteristics are set forth and covered in an application by myself and Lorenz Ach, filed April 21, 1898, Serial No. 678,331, as a starting material. For the purpose of a complete disclosure I will first repeat such description here.

*Preparation of oxymethylene-uric acid.*—One part of uric acid proper is dissolved in fifteen parts of water, together with one part (corresponding to two and one-half molecules)

of caustic potash of eighty-per-cent. strength while gently warming. The solution is then allowed to cool to room temperature, and there are then added thereto 1.6 parts of concentrated solution of formic aldehyde. The whole is then allowed to stand at room temperature. After the lapse of several hours (from about twenty to twenty-five hours) the still clear solution is acidulated with HCl and treated with charcoal by shaking. After filtering the liquor the colorless filtrate is allowed to stand, when the oxymethylene-uric acid will be thrown out in the form of coarse shining prismatic crystals, which are then cleaned by washing with alcohol and ether and drying on the water-bath. The analysis of these crystals gives figures corresponding to the formula $C_6H_6N_4O_4 + H_2O$ or

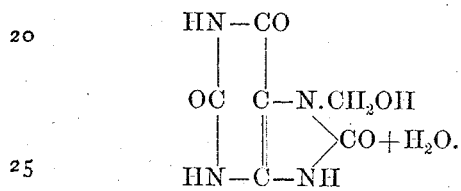

The water of crystallization is slowly driven off by heating for a longer period at a temperature of from 120° to 130° centigrade. The oxymethylene-uric acid, like uric acid proper, gives a strong murexide test with nitric acid or chlorin water and reduces ammoniacal silver solution in the cold.

The new product has no melting-point, but turns brown when heated beyond 320° centigrade and is decomposed at a still higher temperature, the decomposition being attended with darkening and frothing. It is readily recrystallized from water by boiling a short time after adding it thereto. It is thus obtained in the form of fine acicular crystals or short colorless prisms. On protracted boiling with water formaldehyde is split off and the uric acid proper regenerated.

Oxymethylene-uric acid is readily soluble in dilute alkalies. Concentrated alkali-lyes precipitate the corresponding salts after a short time in the form of colorless needles united to form globular aggregates.

The potassium salt of oxymethylene-uric acid may readily be obtained from crystallized acid urate of potassium if the latter is added to five times its weight of concentrated solution of formic aldehyde and the whole allowed to remain together for a considerable period of time—say about thirty to forty hours—the whole being preferably shaken or agitated. The excess of formaldehyde solution is then removed by siphoning, decanting, or otherwise and then washing with alcohol. From the potassium salt so obtained the above-described oxymethylene-uric acid is obtained by supersaturating with mineral acids.

For the preparation of the 7-methyl-uric acid I take one part of the oxymethylene-uric acid in a finely-powdered condition and dissolve the same in twenty-five parts, by volume, of fuming hydrochloric acid, and after heating such solution to 45° centigrade I add thereto from six to seven parts of tin. This temperature of the reduction mixture is maintained until the tin has been completely dissolved. Preferably the mass is stirred or agitated diligently. The resultant colorless solution is then put on the water-bath and evaporated to dryness as nearly as possible. The residue is then taken up with fine spirits (alcohol) while gently heating, (about 50° centigrade.) Under these conditions the 7-methyl-uric acid which has been formed remains in the form of a colorless crystalline mass. If the reactions have been properly conducted, the same is obtained in a perfectly pure condition after once recrystallizing from water. It possesses all of the characteristic properties which have been enumerated for this acid in *Berichte der Deutschen Chemischen Gesellschaft*, Vol. 28, page 2492.

II. *Preparation of 3-7-dimethyl-uric acid.*—As the starting material in the manufacture of this uric acid I employ 3-methyl-7-oxymethylene-uric acid, whose mode of preparation and characteristics are described and covered in the aforesaid application Serial No. 678,331. I will first describe these for the purpose of a full disclosure of my invention.

*Preparation of 3-methyl-oxymethylene-uric acid.*—I take one part of 3-monomethyl-uric acid and add thereto 1.8 parts of potash-lye (potassium-hydrate) of twenty-per-cent. strength and one part of concentrated solution of formic aldehyde and shake the whole until a clear solution results, which occurs in a short time. After allowing this solution to stand for about fifteen to twenty hours at room temperature the liquor is acidulated with hydrochloric acid. The crystallization of the 3-methyl-oxymethylene uric acid begins in the form of colorless crystals. After cooling the mass for several hours with ice-water the liquor is removed from the crystals by decanting, siphoning, or like. The analysis of the crystalline powder so obtained after being dried in an exsiccator or in any suitable manner gives figures corresponding to the formula $C_7H_8N_4O_4$ or

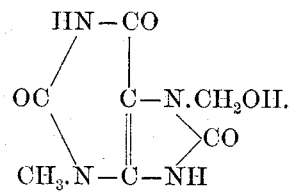

This new compound is readily soluble in boiling water, crystallizing therefrom in the form of colorless prisms for the most part aggregated in druses or nodules. On boiling for a longer period formaldehyde escapes and 3-methyl-uric acid is regenerated. It possesses no melting-point, but is decomposed between 310° and 320° centigrade, this action being accompanied by darkening and effervescence or frothing. It gives the murexid test and reduces ammoniacal silver solution even when gently heating.

3-methyl-oxymethylene-uric acid is readily soluble in dilute alkalies, including ammonia, and also in fuming hydrochloric acid. I take one part of this 3-methyl-oxymethylene-uric acid and dissolve the same in eight parts of fuming hydrochloric acid, and add to the solution from five to six parts of tin. This mixture is allowed to stand while being cooled with ice-water. After the reduction under these conditions has taken place for about twenty hours the separation of the 3-7-dimethyl-uric acid formed begins, the same being thrown out in the form of coarse granular crystals. As soon as the evolution of hydrogen gas becomes less energetic it is accelerated by the introduction of some gaseous hydrochloric acid. After the lapse of about forty hours the liquor is poured off from the undissolved tin and diluted with water, (about twenty parts, by weight.) The dimethyl-uric acid is thus thrown out in the form of crystals, from which the mother-liquor is drained, siphoned, or decanted or removed in any suitable manner. After redissolving the same in dilute ammonia solution and treatment with carbon and finally precipitating with hydrochloric acid the pure 3-7-dimethyl-uric acid, corresponding in every respect to the body described in *Berichte der Deutschen Chemischen Gesellschaft*, Vol. 28, page 2482, is obtained.

III. *Preparation of 1-3-7-trimethyl-uric acid, (hydroxy-caffein.)*—In this process I again employ as a starting material a body described and covered in the aforesaid application Serial No. 678,331, viz: 1-3-dimethyl-7-oxymethylene-uric acid, whose mode of preparation and characteristics I will first describe for the purpose of a full disclosure of my invention.

*Preparation of 1-3-dimethyl-oxymethylene-uric acid.*—I pour over one part of 1-3-dimethyl-uric acid 3.5 parts, by volume, of double normal potash-lye. This causes solution of the acid. After a short time, however, the whole congeals to a pulp or mass of fine acicular crystals, consisting of the potassium salt of the 1-3-dimethyl-uric acid. One part of concentrated solution of formic-aldehyde is now added, which rapidly results in the formation of a clear solution. This solution is allowed to stand, and after some time the potassium salt of the 1-3-dimethyl-oxymethylene-uric acid is separated as a colorless crystalline mass, consisting of small needles aggregated into globular masses. After allowing this crystalline mass to stand for about thirty hours the liquor is drawn off therefrom and the crystalline mass is dissolved in water and acidulated with hydrochloric acid. The crystallization of the free 1-3-dimethyl-oxymethylene-uric acid in the form of colorless fine needles then begins. After cooling the mass for several hours with ice-water the liquor is drawn off from the crystals by siphoning, decanting, or otherwise. An analysis of these crystals after being dried by means of the exsiccator gives figures corresponding to the formula $C_8H_{10}N_4O_4$, or, structurally:

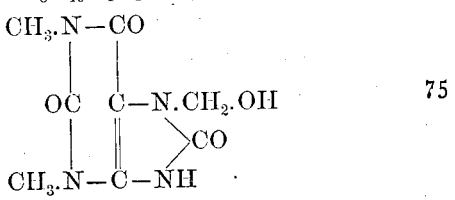

This new acid is soluble in water with tolerable ease and crystallizes therefrom in the form of colorless short prisms. On boiling with water formic-aldehyde is quickly split off, 1-3-dimethyl-uric acid being regenerated. The new product is, moreover, soluble in dilute alkalies, including ammonia, and also in concentrated hydrochloric acid. It has no melting-point, but on boiling to over 300° centigrade it is gradually decomposed, the decomposition being attended by darkening.

When employing the alkylized uric acids as starting materials, the corresponding oxymethylene compounds may also be obtained if the formic-aldehyde be added to a neutral instead of an alkaline solution of such alkyl-uric acid. For these uric acids the generic feature of the process is the addition of formic-aldehyde to a non-acid solution of the uric acid.

In preparing the 1-3-7-trimethyl-uric acid I take one part of the 1-3-dimethyl-7-oxymethylene-uric acid and dissolve it in five parts, by volume, of hydrochloric acid and add five to six parts of tin to the solution. This mixture is allowed to stand while being cooled with ice-water. After the reduction under these conditions has taken place for about twenty hours and after the same is continued at room temperature for about twenty hours the liquor is diluted with about twenty parts of water. Then after filtering from undissolved tin cooled with ice-water for several hours, whereby regenerated 1-3-dimethyl-uric acid is thrown out. After removing these crystals the liquor is evaporated in the water-bath to dryness as nearly as possible. The residue is taken up with about ten parts of cold water and the colorless liquor is allowed to stand for some time, where 1-3-7-trimethyl-uric acid or hydroxy-caffein crystallizes out in the form of fine needles. The remainder of hydroxy-caffein is obtained by extracting by a suitable solvent—such, for example, as chloroform. The compound so obtained possesses all of the characteristic properties which have been enumerated for this acid in *Liebigs Annalen*, Vol. 215, page 268.

What I claim, and desire to secure by Letters Patent of the United States, is—

1. The process of preparing alkylized uric acids which consists in acting upon an oxymethylene-uric acid by reducing agents.

2. The process of preparing alkylized uric acids which consists in acting upon an alkyl-oxymethylene-uric acid by reducing agents.

3. The process of preparing alkylized uric acids which consists in dissolving an oxymethylene-uric acid in an acid and adding to the solution tin.

4. The process of preparing 7-methyl-uric acid which consists in dissolving oxymethylene-uric acid in hydrochloric acid, heating the solution and adding thereto tin, all in the proportions and the conditions, substantially as set forth.

5. The process of preparing 7-methyl-uric acid which consists in dissolving oxy-methylene-uric acid in hydrochloric acid, heating the solution and adding thereto tin, all in the proportions and the conditions, substantially as set forth, then evaporating the solution and taking up the residue with alcohol.

In testimony whereof I affix my signature in presence of two witnesses.

FRITZ ACH.

Witnesses:
LORENZ ACH,
GUSTAV HEINRICH.